US011504665B2

(12) United States Patent
Schwandt et al.

(10) Patent No.: US 11,504,665 B2
(45) Date of Patent: Nov. 22, 2022

(54) ROTATING COALESCING ELEMENT WITH DIRECTED LIQUID DRAINAGE AND GAS OUTLET (71) Applicant: Cummins Filtration IP, Inc., Columbus, IN (US)

(72) Inventors: Brian W. Schwandt, Fort Atkinson, WI (US); Christopher E. Holm, Madison, WI (US); Chirag D. Parikh, Madison, WI (US); Suryanarayanan Paneerselvam, Madison, WI (US); Peter K. Herman, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 269 days.

(21) Appl. No.: 16/876,509

(22) Filed: May 18, 2020

(65) Prior Publication Data
US 2020/0276532 A1 Sep. 3, 2020

Related U.S. Application Data (63) Continuation of application No. 15/753,778, filed as application No. PCT/US2016/048912 on Aug. 26, 2016, now Pat. No. 10,682,601.
(Continued)

(51) Int. Cl.
*B01D 53/02* (2006.01)
*B01D 46/00* (2022.01)
(Continued)

(52) U.S. Cl.
CPC ......... *B01D 46/0031* (2013.01); *B01D 45/14* (2013.01); *B01D 46/003* (2013.01);
(Continued)

(58) Field of Classification Search
CPC .. B01D 45/14; B01D 46/003; B01D 46/0031; B01D 46/0056; B01D 46/2403;
(Continued)

(56) References Cited

U.S. PATENT DOCUMENTS 2,788,125 A   4/1957  Webb
2,905,327 A   9/1959  Phillps
(Continued)

FOREIGN PATENT DOCUMENTS

CN   101491793 A   7/2009
CN   101784325 A   7/2010
(Continued)

OTHER PUBLICATIONS

Office Action for U.S. Appl. No. 15/746,973 dated Jul. 8, 2020, 34 pages.
(Continued)

*Primary Examiner* — Christopher P Jones
(74) *Attorney, Agent, or Firm* — Foley & Lardner LLP (57) ABSTRACT A rotating coalescer having an ejected coalesced liquid separating device is described. The separating device prevents re-entrainment of liquid into a stream of filtered gas. The rotating coalescer includes a rotating filter element or coalescing cone stack positioned within a rotating coalescer housing. The outer surface of the rotating filter element or the outlet of the coalescing cone stack is displaced from the inner surface of the rotating coalescer housing. The gap between the rotating filter element or the coalescing cone stack and the rotating coalescer housing allows for ejected coalesced liquid, such as oil, to accumulate on the inner surface of the rotating coalescer housing for drainage and allows for filtered gas, such as air, to exit through a clean gas outlet of the rotating coalescer housing.

26 Claims, 6 Drawing Sheets

Related U.S. Application Data (60) Provisional application No. 62/211,538, filed on Aug. 28, 2015.

(51) Int. Cl.

| | | |
|---|---|---|
| *B01D 46/24* | (2006.01) | |
| *B01D 46/26* | (2006.01) | |
| *F01M 13/04* | (2006.01) | |
| *B01D 50/20* | (2022.01) | |
| *B01D 45/14* | (2006.01) | |

(52) U.S. Cl.
CPC ..... *B01D 46/0056* (2013.01); *B01D 46/2403* (2013.01); *B01D 46/26* (2013.01); *B01D 50/20* (2022.01); *F01M 13/04* (2013.01); *F01M 2013/0422* (2013.01); *F01M 2013/0438* (2013.01)

(58) Field of Classification Search
CPC ...... B01D 46/26; B01D 50/002; F01M 13/04; F01M 2013/0422; F01M 2013/0438
See application file for complete search history.

(56) References Cited

U.S. PATENT DOCUMENTS

| | | | |
|---|---|---|---|
| 2,937,755 | A | 5/1960 | Szwargulski |
| 3,234,716 | A | 2/1966 | Sevin et al. |
| 3,362,155 | A | 1/1968 | Driscoll |
| 3,451,551 | A | 6/1969 | Sample et al. |
| 3,531,897 | A | 10/1970 | Weimar |
| 3,655,058 | A | 4/1972 | Novak |
| 3,993,564 | A | 11/1976 | Novak |
| 4,189,310 | A | 2/1980 | Hotta |
| 4,279,630 | A | 7/1981 | Nakamura et al. |
| 4,482,365 | A | 11/1984 | Roach |
| 4,487,618 | A | 12/1984 | Mann |
| 4,502,956 | A | 3/1985 | Wilson et al. |
| 4,514,193 | A | 4/1985 | Booth |
| 4,516,994 | A | 5/1985 | Kocher |
| 4,981,502 | A | 1/1991 | Gottschalk |
| 5,056,935 | A | 10/1991 | Singh |
| 5,401,706 | A | 3/1995 | Fischer |
| 5,462,658 | A | 10/1995 | Sem |
| 5,466,385 | A | 11/1995 | Rogers et al. |
| 5,716,423 | A | 2/1998 | Krul et al. |
| 5,863,317 | A | 1/1999 | Smith et al. |
| 6,033,450 | A | 3/2000 | Krul et al. |
| 6,123,061 | A | 9/2000 | Baker et al. |
| 6,139,595 | A | 10/2000 | Herman et al. |
| 6,183,407 | B1 | 2/2001 | Hallgren et al. |
| 6,499,285 | B1 | 12/2002 | Snyder |
| 6,517,612 | B1 | 2/2003 | Crouch et al. |
| 6,640,792 | B2 | 11/2003 | Harvey et al. |
| 6,652,439 | B2 | 11/2003 | Herman et al. |
| 6,709,477 | B1 | 3/2004 | Haakansson et al. |
| 6,876,760 | B1 | 4/2005 | Vaisberg et al. |
| 7,235,177 | B2 | 6/2007 | Herman et al. |
| 7,811,347 | B2 | 10/2010 | Carlsson et al. |
| 7,824,458 | B2 | 11/2010 | Borgstrom et al. |
| 7,824,459 | B2 | 11/2010 | Borgstrom et al. |
| 8,172,917 | B2 | 5/2012 | Kup et al. |
| 8,231,752 | B2 | 7/2012 | Janikowski et al. |
| 8,268,033 | B2 | 9/2012 | Rogers et al. |
| 8,794,222 | B2 | 8/2014 | Schwandt et al. |
| 8,974,567 | B2 | 3/2015 | Verdegan et al. |
| 10,927,730 | B2 | 2/2021 | Barreteau et al. |
| 11,156,137 | B2 | 10/2021 | Barreteau et al. |
| 2003/0034016 | A1 | 2/2003 | Harvey et al. |
| 2004/0016345 | A1 | 1/2004 | Springett et al. |
| 2004/0020839 | A1 | 2/2004 | Kato et al. |
| 2004/0071328 | A1 | 4/2004 | Vaisberg et al. |
| 2004/0214710 | A1 | 10/2004 | Herman et al. |
| 2006/0096263 | A1 | 5/2006 | Kahlbaugh et al. |
| 2006/0242933 | A1 | 11/2006 | Webb et al. |
| 2007/0039300 | A1 | 2/2007 | Kahlbaugh et al. |
| 2007/0175191 | A1 | 8/2007 | Ziebold et al. |
| 2007/0249479 | A1 | 10/2007 | Eliasson et al. |
| 2007/0271884 | A1 | 11/2007 | Pearson et al. |
| 2008/0280777 | A1 | 11/2008 | Bittner et al. |
| 2009/0000258 | A1 | 1/2009 | Carlsson et al. |
| 2009/0020486 | A1 | 1/2009 | Barnwell |
| 2009/0044702 | A1 | 2/2009 | Adamek et al. |
| 2009/0056292 | A1 | 3/2009 | Fornof et al. |
| 2009/0067986 | A1 | 3/2009 | Mignano |
| 2009/0101013 | A1 | 4/2009 | Moredock |
| 2009/0263238 | A1 | 10/2009 | Jarrah |
| 2010/0126145 | A1 | 5/2010 | He et al. |
| 2010/0180854 | A1 | 7/2010 | Baumann et al. |
| 2010/0192529 | A1 | 8/2010 | Schuster |
| 2010/0229511 | A1 | 9/2010 | Steins et al. |
| 2010/0285101 | A1 | 11/2010 | Moore et al. |
| 2011/0180051 | A1 | 7/2011 | Schwandt et al. |
| 2011/0198280 | A1 | 8/2011 | Jones et al. |
| 2011/0247309 | A1 | 10/2011 | Smith et al. |
| 2011/0252974 | A1 | 10/2011 | Verdegan et al. |
| 2011/0263496 | A1 | 10/2011 | Fineman et al. |
| 2012/0034083 | A1 | 2/2012 | Shoji et al. |
| 2012/0118200 | A1 | 5/2012 | Howell et al. |
| 2012/0315225 | A1 | 12/2012 | Porbeni et al. |
| 2013/0037481 | A1 | 2/2013 | Lalouch et al. |
| 2013/0056407 | A1 | 3/2013 | Parikh et al. |
| 2013/0167816 | A1 | 7/2013 | Dawar et al. |
| 2014/0033668 | A1 | 2/2014 | Kleynen |
| 2014/0069432 | A1 | 3/2014 | Mebasser et al. |
| 2014/0096683 | A1 | 4/2014 | Azwell et al. |
| 2014/0326661 | A1 | 11/2014 | Madsen et al. |
| 2015/0047582 | A1 | 2/2015 | Dawar et al. |
| 2015/0075377 | A1 | 3/2015 | Gorbach et al. |
| 2015/0173577 | A1 | 6/2015 | Kim et al. |
| 2016/0030875 | A1 | 2/2016 | Parikh et al. |
| 2016/0245157 | A1 | 8/2016 | Wilkins et al. |
| 2018/0030868 | A1 | 2/2018 | Elsaesser et al. |
| 2018/0117512 | A1 | 5/2018 | Janakiraman et al. |
| 2019/0153635 | A1 | 5/2019 | Ikejiri et al. |

FOREIGN PATENT DOCUMENTS

| | | |
|---|---|---|
| CN | 102596358 A | 7/2012 |
| CN | 104334284 A | 2/2015 |
| DE | 10044615 A1 | 4/2002 |
| DE | 20302824 U1 | 8/2004 |
| DE | 10 2006 024 816 A1 | 12/2007 |
| EP | 1 532 352 A1 | 5/2005 |
| EP | 1 645 320 A1 | 4/2006 |
| FR | 2933626 A1 | 1/2010 |
| JP | h11-141325 A | 5/1999 |
| WO | WO-2011/100712 A1 | 8/2011 |
| WO | WO-2012/106659 A1 | 8/2012 |
| WO | WO-2013/025445 A2 | 2/2013 |
| WO | WO-2016/046944 A1 | 3/2016 |
| WO | WO-2016/159951 A1 | 10/2016 |
| WO | WO-2017/189516 A1 | 11/2017 |
| WO | WO-2018/002244 A1 | 1/2018 |

OTHER PUBLICATIONS

International Search Report and Written Opinion for PCT/US2017/029315, dated Aug. 1, 2017, 11 pages.
Non-Final Office Action on U.S. Appl. No. 15/579,082 dated Jun. 17, 2019.
Non-Final Office Action on U.S. Appl. No. 15/580,481 dated Feb. 14, 2020.
Office Action issued for U.S. Appl. No. 16/096,585, dated Oct. 16, 2019, 10 pages.
Office Action for U.S. Appl. No. 15/561,170 dated Mar. 14, 2019, 11 pages.
Office Action cited for Chinese Patent Application No. CN 201780024820.6 dated Mar. 31, 2020, 11 pages.
Non-Final Office Action issued for U.S. Appl. No. 15/580,481 dated May 3, 2021, 20 pages.
Notice of Allowance issued for U.S. Appl. No. 17/164,369, dated Jun. 21, 2021, 21 pages.

(56) References Cited

OTHER PUBLICATIONS

Final Office Action issued for U.S. Appl. No. 15/580,481, dated Aug. 17, 2020, 27 pages.
U.S. Office Action on U.S. Appl. No. 17/408,805 dated Jan. 31, 2022, 19 pages.
Chinese Office Action from corresponding CN Application No. 2016800326319, dated Mar. 18, 2019, pp. 1-6.
Extended European Search Report for European Patent App. No. 17790235.0 dated Oct. 25, 2019, 9 pages.
First Office Action for Chinese Patent App. No. 2015800784030 dated Mar. 1, 2019, 19 pages (with translation).
First Office Action for Chinese Patent App. No. 201780024820.6 dated Mar. 31, 2020, 22 pages (with translation).
Holdich, "Centrifugal separation," Fundamentals of Particle Technology, Midland Information Technology and Publishing, pp. 77-90 (2002).
International Search Report and Written Opinion for PCT/US2015/023290, dated Jun. 29, 2015, 9 pages.
International Search Report and Written Opinion for PCT/US2016/036384, dated Aug. 25, 2016, 9 pages.
International Search Report and Written Opinion for PCT/US2016/036432, dated Aug. 31, 2016, 13 pages.
International Search Report and Written Opinion for PCT/US2016/047755, dated Nov. 4, 2016, 10 pages.
International Search Report and Written Opinion for PCT/US2016/048912, dated Nov. 10, 2016, 6 pages.

ROTATING COALESCING ELEMENT WITH DIRECTED LIQUID DRAINAGE AND GAS OUTLET

CROSS-REFERENCE TO RELATED APPLICATIONS

This application is a continuation of U.S. patent application Ser. No. 15/753,778, filed Feb. 20, 2018, which is a national stage of PCT Application No. PCT/US2016/048912, filed Aug. 26, 2016, which claims priority to U.S. Provisional Patent Application No. 62/211,538, entitled "ROTATING COALESCING ELEMENT WITH DIRECTED LIQUID DRAINAGE AND GAS OUTLET," by Schwandt et al. filed Aug. 28, 2015. The contents of these applications are hereby incorporated by reference in their entirety.

TECHNICAL FIELD

The present application relates to rotating coalescing elements.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the blowby gases can harm the environment. Accordingly, the blowby gases are typically routed out of the crankcase via a crankcase ventilation system. The crankcase ventilation system may pass the blowby gases through a coalescer (i.e., a coalescing filter element) to remove a majority of the aerosols and oils contained in the blowby gases. The coalescer includes filter media. The filtered blowby gases ("clean" gases) are then either vented to the ambient (in open crankcase ventilation systems) or routed back to the air intake for the internal combustion engine for further combustion (in closed crankcase ventilation systems).

Some crankcase ventilation systems utilize rotating coalescers that increase the filter efficiency of the coalescing filter elements by rotating the filter media during filtering. In rotating filter cartridges, the contaminants (e.g., oil droplets suspended and transported by blowby gases) are separated inside the filter media of the filter cartridge through the particle capture mechanisms of inertial impaction, interception, diffusion, and gravitational forces onto the fibers. By rotating the filter media, inertial impaction and gravitational forces are enhanced by the additional centrifugal force. Additionally, the rotation of the filter cartridge can create a pumping effect, which reduces the pressure drop through the filtration system. Rotating filter cartridges may include fibrous filters as well as centrifugal separation devices.

The centrifugal forces caused by the rotation tend to eject coalesced liquid droplets along the entire axial height of the filter media. Depending on the location of ejection and the speed of rotation, the separated liquid droplets may be re-entrained into the flow stream of filtered air. Further, the ejected liquid droplets may be collected on a stationary surface of the coalescer housing at an undesirable area. This increased liquid carry-over of the rotating coalescer can reduce the efficiency of the filtration system. Further, the increased liquid carry-over can make it difficult to position a gas flow outlet for the coalescer housing directly opposite of the rotating coalescer outer diameter due to direct ejection of the coalesced droplets towards the outlet.

SUMMARY

One example embodiment relates to a filtration system. The filtration system includes a filtration system housing having an inlet and an outlet. A rotating coalescer element is positioned within the filtration system housing and in fluid communication with the inlet and the outlet. The rotating coalescer element is configured to separate a suspended liquid from a fluid received through the inlet. The rotating coalescer element includes a first endplate, a second endplate, and a coalescing device positioned between the first endplate and the second endplate. The rotating coalescer element further includes a rotating coalescer housing extending between and coupled to the first endplate and the second endplate. The rotating coalescer housing is radially displaced from an outer surface of the coalescing device such that a gap exists between an inner wall of the rotating coalescer housing and the outer surface of the coalescing device. The rotating coalescer housing includes a clean gas outlet adjacent the first endplate and a liquid outlet adjacent the second endplate. The rotating coalescer housing including a circumferential ring positioned near the gas outlet that prevents separated liquid accumulated on the inner wall from passing through the clean gas outlet.

Another example embodiment relates to a rotating coalescer element. The rotating coalescer element is configured to separate a suspended liquid from a fluid. The rotating coalescer element includes a first endplate, a second endplate, and a coalescing device positioned between the first endplate and the second endplate. The rotating coalescer element further includes a rotating coalescer housing extending between and coupled to the first endplate and the second endplate. The rotating coalescer housing is radially displaced from an outer surface of the coalescing device such that a gap exists between an inner wall of the rotating coalescer housing and the outer surface of the coalescing device. The rotating coalescer housing includes a clean gas outlet adjacent the first endplate and a liquid outlet adjacent the second endplate. The rotating coalescer housing including a circumferential ring positioned near the gas outlet that prevents separated liquid accumulated on the inner wall from passing through the clean gas outlet.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a rotating coalescer having an ejected coalesced liquid separating device is described. The separating device prevents re-entrainment of liquid into a stream of filtered gas. The rotating coalescer includes a rotating filter element or coalescing cone stack positioned within a rotating coalescer housing. The outer surface (i.e., the clean side) of the rotating filter element or the outlet of the coalescing cone stack is displaced from the inner surface of the rotating coalescer housing. The gap between the rotating filter element or the coalescing cone stack and the rotating coalescer housing allows for ejected coalesced liquid, such as oil, to accumulate on the inner surface of the rotating coalescer housing for drainage and allows for filtered gas, such as air, to exit through a clean gas outlet of the rotating coalescer housing. In some arrangements, the rotating coalescer housing includes a rib that prevents accumulated liquid from flowing through the clean gas outlet. In further arrangements, the inner surface of the rotating coalescer housing is angled to assist with drainage of the accumulated liquid.

Figure 1:
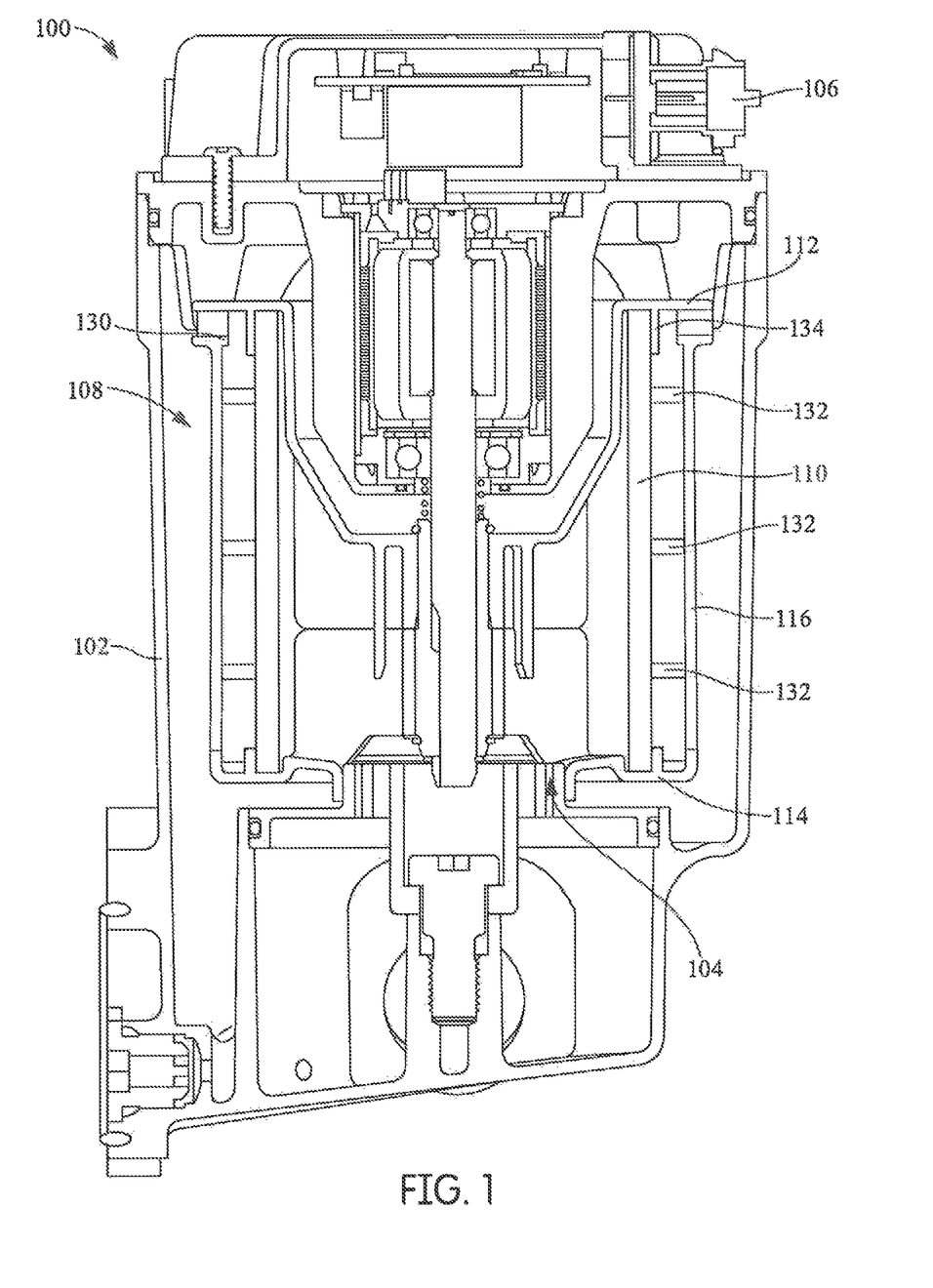
FIG. 1 shows a cross-sectional view of a filtration system is shown according to an example embodiment.
Figure 2:
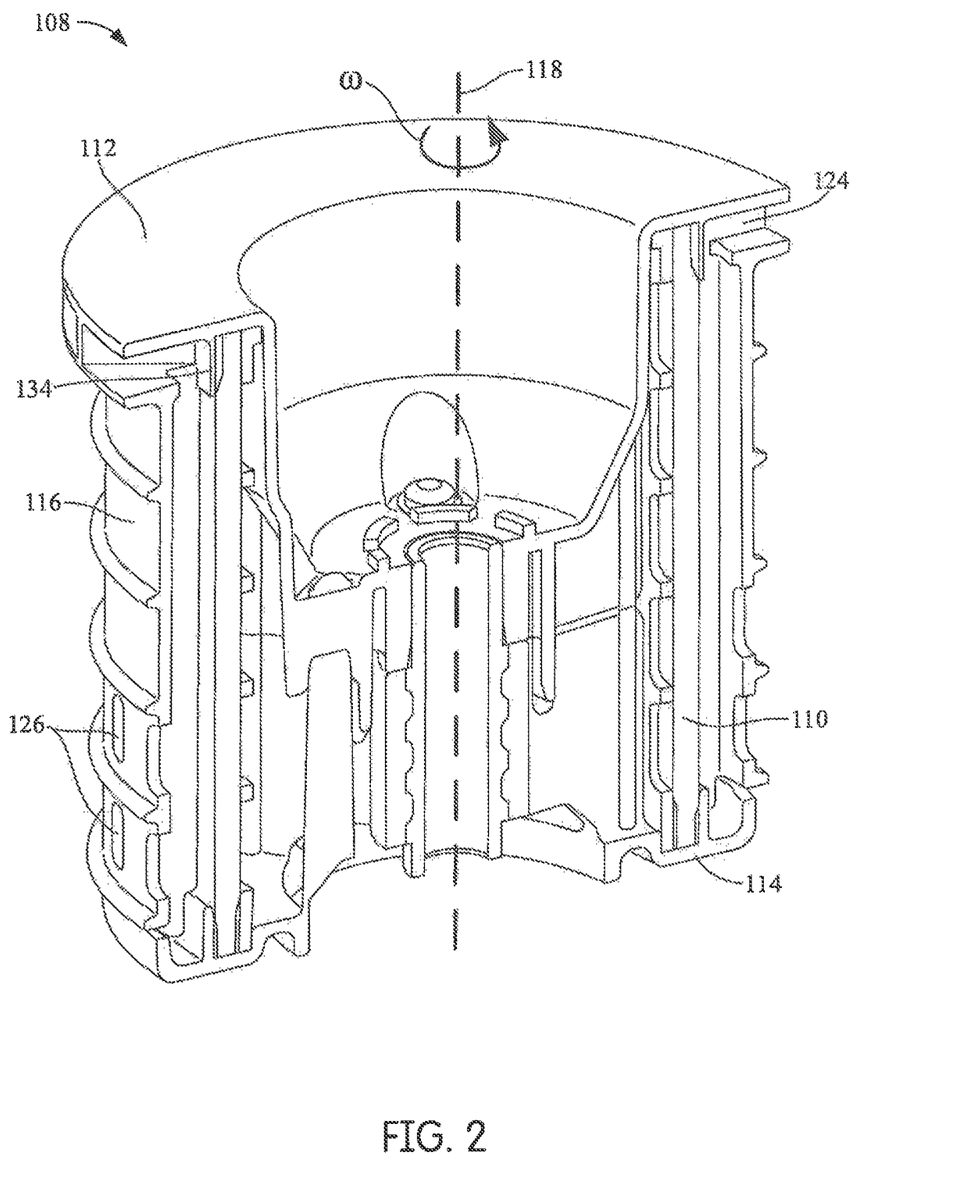
FIG. 2 shows a cross-sectional view of the rotating filter element of the filtration system of FIG. 1.
Figure 3:
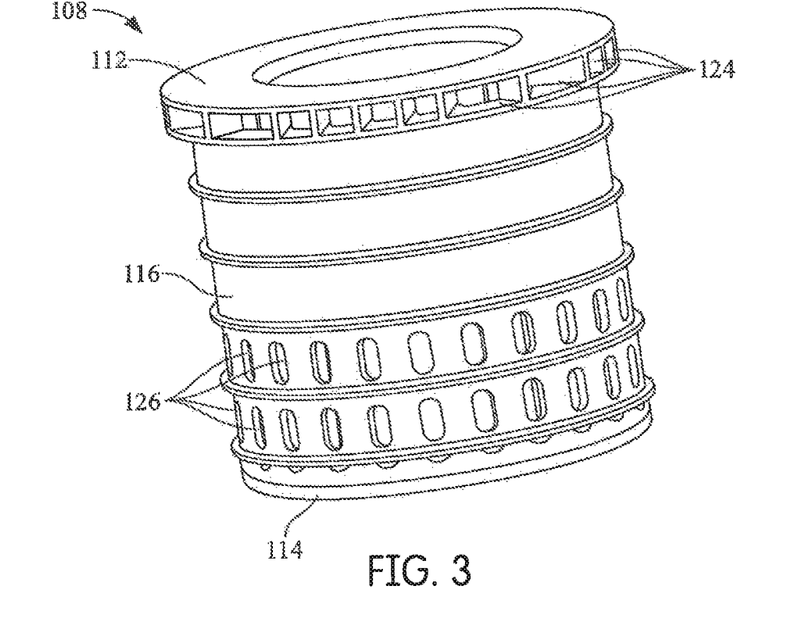
FIG. 3 shows a perspective view of the rotating filter element of the filtration system of FIG. 1.
Figure 4:
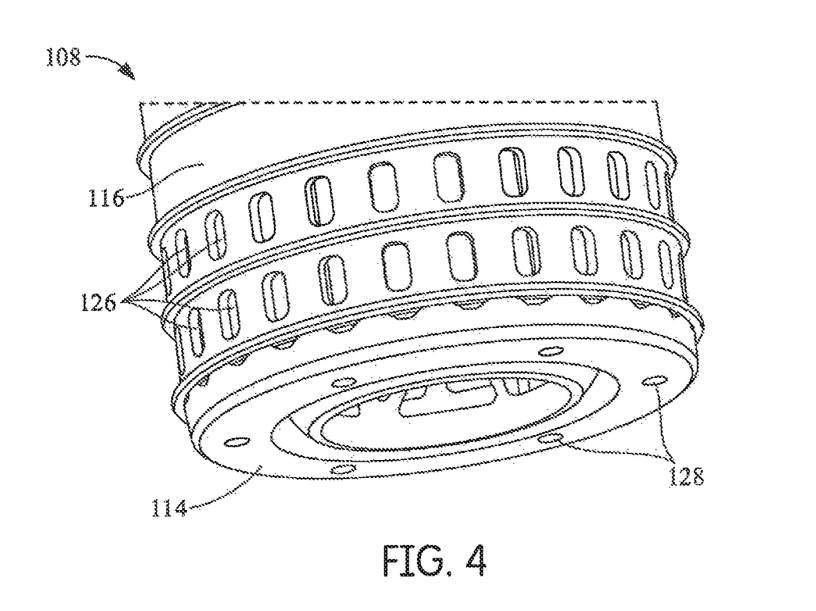
FIG. 4 shows another perspective view of the rotating filter element of the filtration system of FIG. 1.
Figure 5:
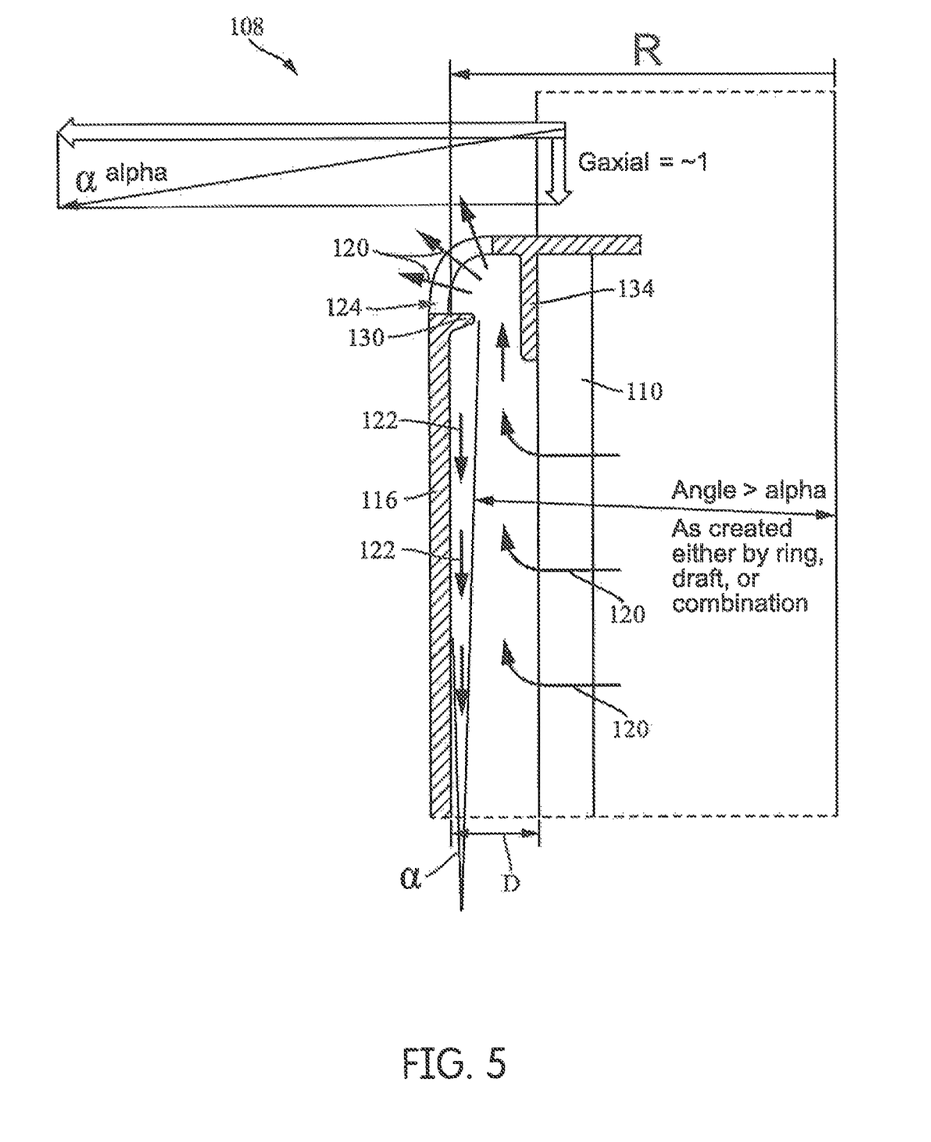
FIG. 5 shows another cross-sectional view of the rotating filter element of the filtration system of FIG. 1.

Referring to FIG. 1, a cross-sectional view of a filtration system 100 is shown according to an example embodiment. The filtration system 100 includes a filtration system housing 102 having an inlet 104 and an outlet 106. The filtration system housing 102 is a stationary housing. The inlet 104 receives fluid to be filtered, such as crankcase blowby gases, and the outlet 106 outputs filtered fluid to a system, such as an internal combustion engine (e.g., a diesel internal combustion engine). The filtration system 100 includes a rotating filter element 108. The rotating filter element 108 is a rotating coalescer element. The rotating filter element 108 includes filter media 110. The filter media 110 shown in FIG. 1 is arranged in a cylindrical shape. The filter media 110 is a coalescing fibrous filter media. The rotating filter element 108 includes a first endplate 112 and a second endplate 114. The filter media 110 is positioned between the first endplate 112 and the second endplate 114. In some arrangements, the filter media 110 is sealed to the first endplate 112 and the second endplate 114. The rotating filter element 108 further includes a rotating coalescer housing 116. The rotating coalescer housing 116 extends between and is coupled to the first endplate 112 and the second endplate 114. The rotating coalescer housing 116 is radially displaced from an outer surface of the filter media 110. Generally, the rotating filter element 108 separates a suspended liquid in the fluid. In arrangements where the filtration system 100 is a crankcase ventilation system, the rotating filter element 108 separates oils and aerosols suspended in the crankcase blowby gases. The rotating filter element 108 is described in further detail below with respect to FIGS. 2 through 7.

Referring to FIGS. 2 through 5, various views of the rotating filter element 108 are shown. As shown best in FIGS. 2 and 5, the rotating filter element 108 includes a central axis 118. During operation, the rotating filter element 108 rotates about a central axis. Fluid to be filtered enters the filtration system housing 102 through the inlet 104. The fluid flows through the filter media 110 as shown by flow arrows 120 in FIG. 5. As the fluid passes through the filter media 110, liquid droplets dispersed in the fluid are coalesced and separated from the fluid by the filter media 110. Due to the rotation of the rotating filter element 108 and the centrifugal force imparted on the separated liquid, the separated liquid may be ejected from the outlet face of the filter media 110. As noted above, the inner wall of the rotating coalescer housing 116 is separated from the outlet face of the filter media 110 (e.g., by a distance D). The separation distance D permits the ejected liquid to accumulate along the inner wall of the rotating coalescer housing 116 while still providing space for the filtered fluid to flow out of the rotating filter element 108. As the separated liquid accumulates on the inner wall of the rotating coalescer housing 16, the separated liquid may form a film of liquid along the inner wall of the rotating coalescer housing 116. The separated liquid flows to a drain (as designated by the drainage arrow 122). The filtered fluid exits the rotating filter element 108 through a plurality of gas outlets 124 formed between the first endplate 112 and the rotating coalescer housing 116. The accumulated liquid along the inner wall of the rotating coalescer housing 116 exits the rotating filter element 108 through a plurality of liquid outlets 126 formed in the rotating coalescer housing 116 and a plurality of drains 128 formed in the second endplate 114. As shown best in FIG. 3, the liquid outlets 126 are formed near the opposite end of the rotating coalescer housing 116 from the gas outlets 124. As described in further detail below, the rotating coalescer housing 116 includes features that assist in preventing the accumulated fluid from flowing out of the gas outlets 124. In some arrangements, the rotating coalescer housing 116 and the first endplate 112, or at least a portion there of, are formed as a single piece of injection molded thermoplastic.

In some arrangements, the inner wall of the rotating coalescer housing 116 includes a circumferential ring 130 positioned near the gas outlets 124 of the rotating filter element 108. The circumferential ring 130 prevents the separated liquid from flowing through the gas outlets 124. Due to the rotation of the rotating filter element 108, the film of accumulated liquid that forms along the inner wall of the rotating coalescer housing 116 can only reach a certain thickness. The height of the circumferential ring 130 with respect to the inner wall of the rotating coalescer housing 116 is greater than the maximum thickness of the film of accumulated liquid thereby preventing the liquid from exiting the rotating filter element through the gas outlets 124.

Figure 7:
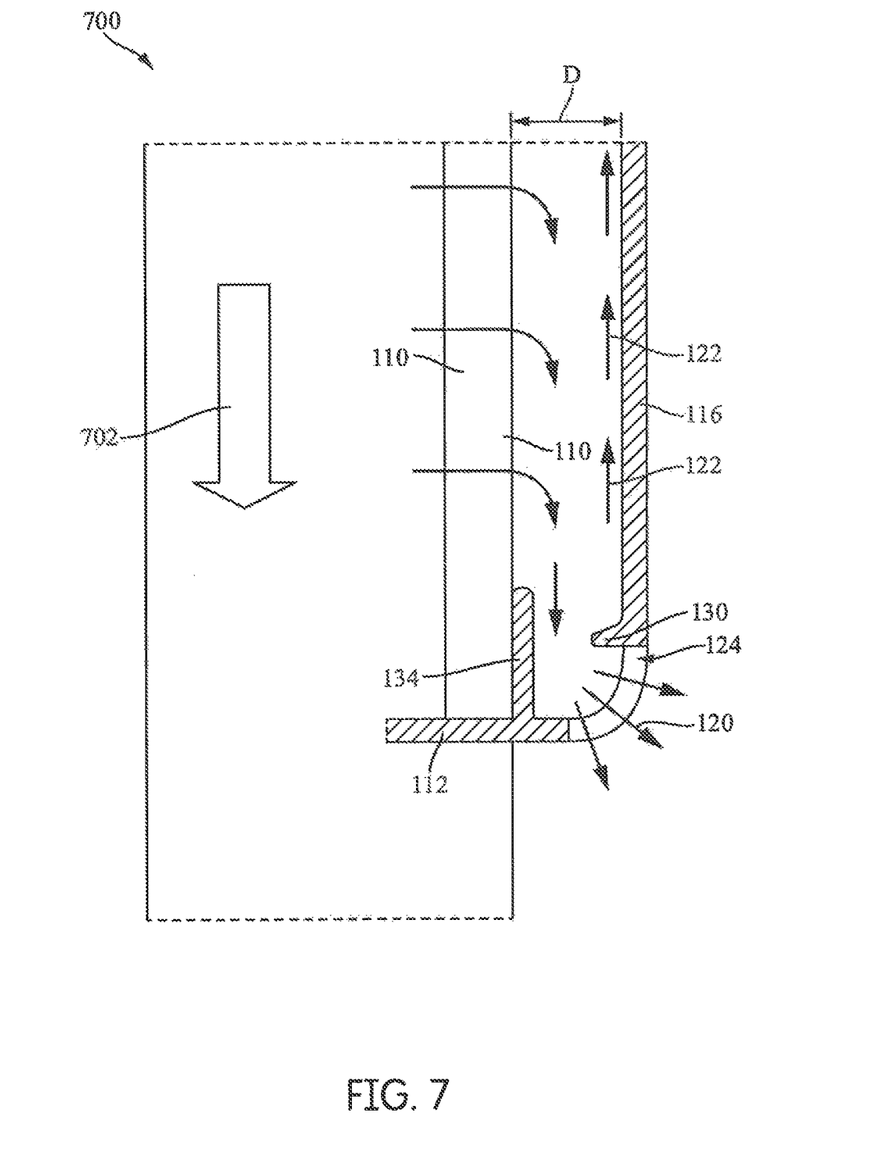
FIG. 7 is a cross-sectional view of a rotating filter element according to another example embodiment.

In further arrangements, the rotating coalescer housing 116 may be angled at a draft angle $\alpha$ away from the gas outlets 124. In such arrangements, the rotating coalescer housing is narrower at the end adjacent to the gas outlets 124 (i.e., the first endplate 112) and wider at the end adjacent to the liquid outlets 126 (i.e., the second endplate 114). Thus, the rotating coalescer housing 116 may be slightly conical, convex, or concave in shape. During rotation, the centrifugal forces on the accumulated liquid will move the accumulated along angled wall of the rotating coalescer housing 116 in an axial direction towards the liquid outlets 126 and away from the gas outlets 124. In some arrangements, the centrifugal forces on the accumulated liquid in the axial direction are greater than gravity. In such arrangements, the gas outlet 124 and the liquid outlet can be flipped in the direction of gravity (e.g., as shown in FIG. 7).

Neglecting viscous and/or shear forces from the flow of gas between the filter media 110 and the rotating coalescer housing 116, the accumulated liquid on the inner wall of the rotating coalescer housing 116 forms a "near vertical" liquid film, where the equilibrium surface angle with respect to axis=$\alpha$ (if no drainage occurred and the accumulated liquid were trapped within the rotating filter element 108) would be approximately $\tan^{-1}(1/\text{Gradial})$, where the Gradial is defined by equation (1) below.

$$\omega^2 * R = \text{Gradial} \geq \sim 1000 \quad (1)$$

In equation 1, ω is the rotational speed of the rotating filter element 108 during operation and R is the distance between the central axis 118 and the inside of the rotating coalescer housing 116. Accordingly, the height of the circumferential ring 130, the draft angle α, or a combination thereof creates an effective angle greater than $\tan^{-1}$ (1/Gradial) to achieve drainage in the desired direction (i.e., away from the gas outlets 124 and towards the liquid outlets 126. For example, for a Gradial of approximately 1000, the draft angle 132 is approximately 0.06 degrees.

Still referring to FIGS. 1 through 5, in some arrangements, the rotating coalescer housing 116 includes a plurality of support ribs 132 projecting from the inner surface of the rotating coalescer housing 116 to the outlet face of the filter media 110. The support ribs 132 provide support to the flexible fibrous media 110 during rotation of the filter element 108 to prevent excessive deformation of the filter media 110 during high speed rotation. In order to allow filtered fluid to exit through the gas outlets 124, the support ribs 132 may include a number of first through-holes that allow the filtered fluid to pass between the support ribs 132. Alternatively, gas outlets 124 may be positioned between adjacent sets of support ribs 132 and between the outermost support ribs 132 and the first and second endplates 112 and 114. Additionally, to allow the accumulated liquid to drain, the support ribs 132 include a number of second through-holes that allow the accumulated liquid to pass between the support ribs 132. Alternatively, liquid outlets 126 may be positioned between adjacent sets of support ribs 132 and between the outermost support ribs 132 and the first and second endplates 112 and 114.

In some arrangements, an axial rib ring extends 134 from the gas outlet end of the rotating coalescer housing 116 adjacent to the filter media 110. The axial rib ring 134 extends into the rotating coalescer housing 116 beyond the axial location of the circumferential ring 130, which prevents accumulated liquid from migrating to the gas outlets 124. The axial rib ring 134 acts as a weir that prevents accumulated liquid exiting the filter media 110 from ejecting directly to the gas outlets 124.

Figure 6:
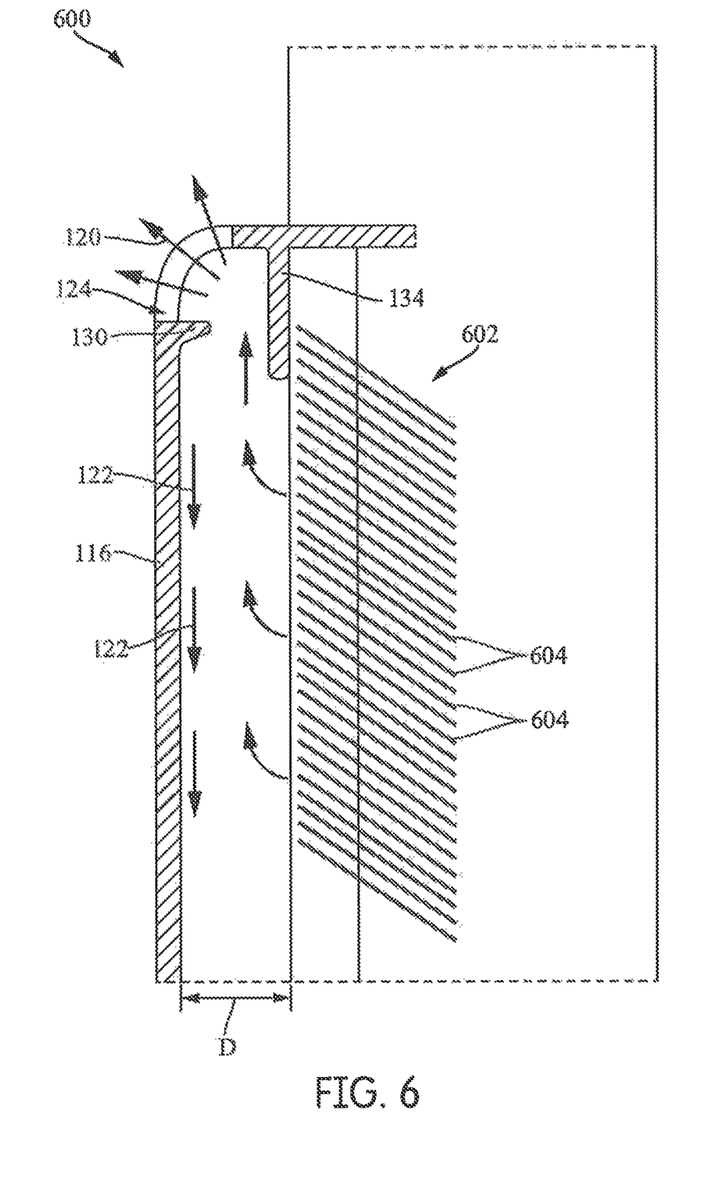
FIG. 6 is a cross-sectional view of a rotating coalescer element according to an example embodiment.

Referring to FIG. 6, a cross-sectional view of a rotating coalescer element 600 is shown according to an example embodiment. The rotating coalescer element 600 is similar to the rotating filter element 108 of filtration system 100. Accordingly, like numbering is used between the rotating coalescer element 600 of FIG. 6 and the rotating filter element of FIGS. 1 through 5. The only difference between the rotating coalescer element 600 and the rotating filter element 108 is that the rotating coalescer element 600 does not utilize filter media to separate a liquid suspended in the fluid flowing through the rotating coalescer element 600. Rather, the rotating coalescer element 600 utilizes a centrifuge cone stack 602. The centrifuge cone stack 602 includes a plurality of axially spaced centrifuge cones 604. Each of the cones is angled with respect to the radial direction. As the gas passes through the space between each of the axially spaced centrifuge cones 604, the angle of the individual axially spaced centrifuge cones 604 causes an abrupt change in direction of the gas. The abrupt change of direction separates the suspended liquid due to the higher inertia of the liquid as compared to the gas.

FIG. 7 shows a cross-sectional view of a rotating filter element 700 according to an example embodiment. The rotating filter element 700 is similar to the rotating filter element 108 of filtration system 100. Accordingly, like numbering is used between the rotating filter element 700 of FIG. 7 and the rotating filter element of FIGS. 1 through 5. As shown in FIG. 7, the rotating filter element 700 is oriented in the opposite direction with respect to gravity 702 than the rotating filter element 108. Accordingly, the accumulated liquid is drained from the rotating filter element 700 against the force of gravity. The drainage is achieved because the centrifugal force on the accumulated liquid is high enough to overcome the force of gravity. The orientation of the filter element 700 permits a top inlet of the gas-liquid mixture into the device and a bottom clean gas outlet. Such an arrangement may be preferred for certain crankcase ventilation applications in which the source of the aerosol laden blowby gas to be cleaned is above the location of the rotating coalescing device.

The above-described rotating coalescer and filter elements may be used in crankcase ventilation systems. In some arrangements, the above-described rotating coalescer and filter elements are used in high-speed rotating coalescer arrangements in which the radial g-force at the inner diameter of the rotating coalescer housing 116 is at least 1000 times the force of gravity.

The above-described rotating coalescer and filter elements provide a number advantages in accordance with various embodiments. By changing the shape of the rotating coalescer housing (e.g., the rotating coalescer housing 116), separated liquid can be directed to a desired location by harnessing axial and radial components of the centrifugal force created by the rotation. This allows for an unlimited amount of locations for accumulated liquid to be ejected from the rotating coalescer housing. This minimizes or eliminates the risk of accumulated liquid becoming re-entrained into the filtered fluid via the gas outlet. Similarly, by utilizing the centrifugal forces to move the accumulated liquid, the coalescing element could be operated at any angle, provided that the outlet liquid ejected from the rotating body is captured in an area of the stationary housing which directs the ejected liquid away and does not allow it to recombine with the clean gas outlet.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about" or "approximately" when coupled to a number or a range means plus or minus five percent of the modified number or range. When a range is described as being between two numbers, the range is intended to be inclusive of the two numbers that define the range.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system comprising:
a filtration system housing having an inlet and an outlet,
a rotating coalescer element positioned within the filtration system housing and in fluid communication with the inlet and the outlet, the rotating coalescer element configured to separate a suspended liquid from a fluid received through the inlet, the rotating coalescer element including:
a first endplate,
a second endplate,
a coalescing device positioned between the first endplate and the second endplate, and
a rotating coalescer housing extending between and coupled to the first endplate and the second endplate, the rotating coalescer housing radially displaced from an outer surface of the coalescing device such that a gap exists between an inner wall of the rotating coalescer housing and the outer surface of the coalescing device, the rotating coalescer housing including:
a clean gas outlet adjacent the first endplate and a liquid outlet adjacent the second endplate; and
a plurality of support ribs to provide support to the coalescing device, each of the plurality of support ribs projecting radially from the inner wall of the rotating coalescer housing inward toward a portion of the outer surface of the coalescing device, the portion of the outer surface of the coalescing device disposed between the first endplate and the second end plate.

2. The filtration system of claim 1, wherein the plurality of support ribs comprises a first plurality of through-holes configured to allow filtered fluid to pass between the plurality of support ribs.

3. The filtration system of claim 2, wherein the plurality of support ribs comprises a second plurality of through-holes configured to allow accumulated liquid to pass between the plurality of support ribs.

4. The filtration system of claim 1, further comprising an axial rib ring extending from a gas outlet end of the rotating coalescer housing.

5. A filtration system comprising:
a filtration system housing having an inlet and an outlet,
a rotating coalescer element positioned within the filtration system housing and in fluid communication with the inlet and the outlet, the rotating coalescer element configured to separate a suspended liquid from a fluid received through the inlet, the rotating coalescer element including:
a first endplate,
a second endplate,
a coalescing device positioned between the first endplate and the second endplate, and
a rotating coalescer housing extending between and coupled to the first endplate and the second endplate, the rotating coalescer housing radially displaced from an outer surface of the coalescing device such that a gap exists between an inner wall of the rotating coalescer housing and the outer surface of the coalescing device, the rotating coalescer housing including:
a clean gas outlet adjacent the first endplate and a liquid outlet adjacent the second endplate;
a plurality of support ribs projecting from the inner wall to provide support to the coalescing device; and
an axial rib ring extending from a gas outlet of the rotating coalescer housing, wherein the axial rib ring extends into the rotating coalescer housing beyond an axial location of a circumferential ring positioned near the gas outlet.

6. A filtration system comprising:
a filtration system housing having an inlet and an outlet,
a rotating coalescer element positioned within the filtration system housing and in fluid communication with the inlet and the outlet, the rotating coalescer element configured to separate a suspended liquid from a fluid received through the inlet, the rotating coalescer element including:
a first endplate,
a second endplate,
a coalescing device positioned between the first endplate and the second endplate, and
a rotating coalescer housing extending between and coupled to the first endplate and the second endplate, the rotating coalescer housing radially displaced from an outer surface of the coalescing device such that a gap exists between an inner wall of the rotating coalescer housing and the outer surface of the coalescing device, the rotating coalescer housing including:
a clean gas outlet adjacent the first endplate and a liquid outlet adjacent the second endplate;
a plurality of support ribs projecting from the inner wall to provide support to the coalescing device; and
an axial rib ring extending from a gas outlet end of the rotating coalescer housing, wherein the axial rib ring prevents accumulated liquid from ejecting directly into the gas outlet.

7. The filtration system of claim 1, wherein the coalescing device includes a filter media.

8. The filtration system of claim 1, wherein the coalescing device includes a coalescer cone stack.

9. The filtration system of claim 1, wherein the rotating coalescer housing is narrower at a first end adjacent to the gas outlet and wider at a second end adjacent to the liquid outlet.

10. The filtration system of claim 9, wherein the accumulated liquid is drained from the rotating coalescer element against the force of gravity.

11. The filtration system claim 1, wherein the rotating coalescer element is a high-speed rotating coalescer element that creates a radial g-force at the inner wall of the rotating coalescer housing of at least 1000 times the force of gravity.

12. The filtration system of claim 1, wherein the fluid is crankcase blowby gas received from an internal combustion engine.

13. The filtration system of claim 1, wherein the second endplate comprises a plurality of drains.

14. A rotating coalescer element configured to separate a suspended liquid from a fluid, the rotating coalescer element comprising:
a first endplate,
a second endplate,
a coalescing device positioned between the first endplate and the second endplate, and
a rotating coalescer housing extending between and coupled to the first endplate and the second endplate, the rotating coalescer housing radially displaced from an outer surface of the coalescing device such that a gap exists between an inner wall of the rotating coalescer housing and the outer surface of the coalescing device, the rotating coalescer housing including a clean gas outlet adjacent the first endplate and a liquid outlet adjacent the second endplate, the rotating coalesce housing including a plurality of support ribs to provide support to the coalescing device, each of the plurality of support ribs projecting radially from the inner wall of the rotating coalescer housing inward toward a portion of the outer surface of the coalescing device, the portion of the outer surface of the coalescing device disposed between the first endplate and the second endplate.

15. The rotating coalescer element of claim 14, wherein the plurality of support ribs comprises a first plurality of through-holes configured to allow filtered fluid to pass between the plurality of support ribs.

16. The rotating coalescer element of claim 15, wherein the plurality of support ribs comprises a second plurality of through-holes configured to allow accumulated liquid to pass between the plurality of support ribs.

17. The rotating coalescer element of claim 14, further comprising an axial rib ring extending from a gas outlet end of the rotating coalescer housing.

18. A rotating coalescer element configured to separate a suspended liquid form a fluid, the rotating coalescer element comprising:
a first endplate,
a second endplate,
a coalescing device positioned between the first endplate and the second endplate, and
a rotating coalescer housing extending between and coupled to the first endplate and the second endplate, the rotating coalescer housing radially displaced from an outer surface of the coalescing device such that a gap exists between an inner wall of the rotating coalescer housing and the outer surface of the coalescing device, the rotating coalescer housing including a clean gas outlet adjacent the first endplate and a liquid outlet adjacent the second endplate, the rotating coalesce housing including a plurality of support ribs projecting from the inner wall to provide support to the coalescing device, and the rotating coalescer housing including an axial rib extending from a gas outlet end of the rotating coalescer housing, wherein the axial rib ring extends into the rotating coalescer housing beyond an axial location of a circumferential ring positioned near the gas outlet.

19. A rotating coalescer element configured to separate a suspended liquid form a fluid, the rotating coalescer element comprising:
a first endplate,
a second endplate,
a coalescing device positioned between the first endplate and the second endplate, and
a rotating coalescer housing extending between and coupled to the first endplate and the second endplate, the rotating coalescer housing radially displaced from an outer surface of the coalescing device such that a gap exists between an inner wall of the rotating coalescer housing and the outer surface of the coalescing device, the rotating coalescer housing including a clean gas outlet adjacent the first endplate and a liquid outlet adjacent the second endplate, the rotating coalesce housing including a plurality of support ribs projecting from the inner wall to provide support to the coalescing device, and the rotating coalescer housing including an axial rib extending from a gas outlet end of the rotating coalescer housing, wherein the axial rib ring prevents accumulated liquid from ejecting directly into the gas outlet.

20. The rotating coalescer element of claim 14, wherein the coalescing device includes a filter media.

21. The rotating coalescer element of claim 14, wherein the coalescing device includes a coalescer cone stack.

22. The rotating coalescer element of claim 14, wherein the rotating coalescer housing is narrower at a first end adjacent to the gas outlet and wider at a second end adjacent to the liquid outlet.

23. The rotating coalescer element of claim 14, wherein the accumulated liquid is drained from the rotating coalescer element against the force of gravity.

24. The rotating coalescer element of claim 14, wherein the rotating coalescer element is a high-speed rotating coalescer element that creates a radial g-force at the inner wall of the rotating coalescer housing of at least 1000 times the force of gravity.

25. The rotating coalescer element of claim 14, wherein the fluid is crankcase blowby gas received from an internal combustion engine.

26. The rotating coalescer element of claim 14, wherein the second endplate comprises a plurality of drains.

\* \* \* \* \*